United States Patent [19]

Franco

[11] Patent Number: 4,893,330

[45] Date of Patent: Jan. 9, 1990

[54] METHOD AND APPARATUS FOR RESTRICTING CREDIT CARD COMMUNICATION CALLS

[75] Inventor: Victor A. Franco, Old Bridge, N.J.

[73] Assignee: American Telephone and Telegraph Company, New York, N.Y.; AT&T Bell Laboratories, Murray Hill, N.J.

[21] Appl. No.: 360,178

[22] Filed: Jun. 1, 1989

[51] Int. Cl.[4] .................. H04M 3/38; H04M 11/00
[52] U.S. Cl. .................................. 379/91; 379/115; 379/145
[58] Field of Search ............... 379/127, 91, 114, 115, 379/145

[56] References Cited

U.S. PATENT DOCUMENTS 4,756,020 7/1988 Fodale .......................... 379/91 X Primary Examiner—Stafford D. Schreyer
Attorney, Agent, or Firm—John A. Caccuro

[57] ABSTRACT

A method and an apparatus are disclosed to enable a public switching network to limit the geographical calling area of calls charged to a credit card. When a credit card call is originated, the called party number is included as part of the credit card validation request. The called party number is compared against numbers stored in a call restriction table previously entered by the owner of the credit card. The network accepts or denies credit card calls as a result of this comparison.

27 Claims, 3 Drawing Sheets

METHOD AND APPARATUS FOR RESTRICTING CREDIT CARD COMMUNICATION CALLS

TECHNICAL FIELD

This invention relates to the charging and billing of communication calls and, more particularly, to an automated method of validating a request to charge a call using a credit card.

BACKGROUND OF THE INVENTION

Credit card billing is supplementing and gradually replacing the use of cash as the preferred method for the payment of goods and services. The use of credit cards for the payment of telecommunication services also is increasing and, in some situations such as calls from pay telephones, is the preferrd method of paying for calls.

To better manage the increasing use of credit cards to bill telecommunication services, telephone companies have incorporated data base systems to provide automated billing of calls or to assist the operator in the billing of calls. One such arrangement is described in A. B. Mearns U.S. Pat. No. 4,162,377. In Mearns, a method of automatically processing special service calls (such as credit card, collect and charge-to-a-third number calls) is disclosed which verifies the entitlement of a caller to charge and bill the call to a number other than that of the station from which the call is originated. The method, referred to as ABC (Auto Bill Calling), furnishes automated collect calling and unrestricted calling on credit card and charge-to-a-third number calls.

Businesses have found it desirable to provide their employees with credit cards for charging telephone calls during business trips. However, businesses do not want to pay for non-business related calls of the employee. Businesses would like a cost-effective way to restrict certain types of credit card calls.

One prior AT&T service uses a "call me" card which prevents a caller from using a telephone charge card to bill a call to other than the telephone number on the telephone charge card. The above-identified Mearns patent also discloses a method for assisting operators in preventing collect calls and bill-to-a-third number calls from being billed to pay telephone stations within a designated area.

Notwithstanding these important prior art arrangements, there is an increasing need to provide businesses and other owners of credit cards with a more flexible way to restrict the use of their credit cards for billing communications calls.

SUMMARY OF THE INVENTION

In accordance with the present invention, apparatus and method are disclosed for limiting the geographical calling area of calls charged to a credit card. The present invention is implemented as part of, and hereinafter referred to as, a Customer Account Services (CAS) system. According to the CAS system, when a credit card call is originated, the called party number is included as part of the credit card validation request made by the local exchange carrier (LEC) to the common carrier network. The network validates the credit card for billing purposes, and also compares the called number against numbers stored in a call restriction table previously entered by the owner of the credit card. If the called number is to a geographically restricted area or number, a call denial response is sent from the network, via the LEC, to the caller. Calls can also be restricted based on the calling party number. As in the prior art, a call denial response is also given to the caller if the credit card is invalid for billing calls.

DETAILED DESCRIPTION

Figure 1:
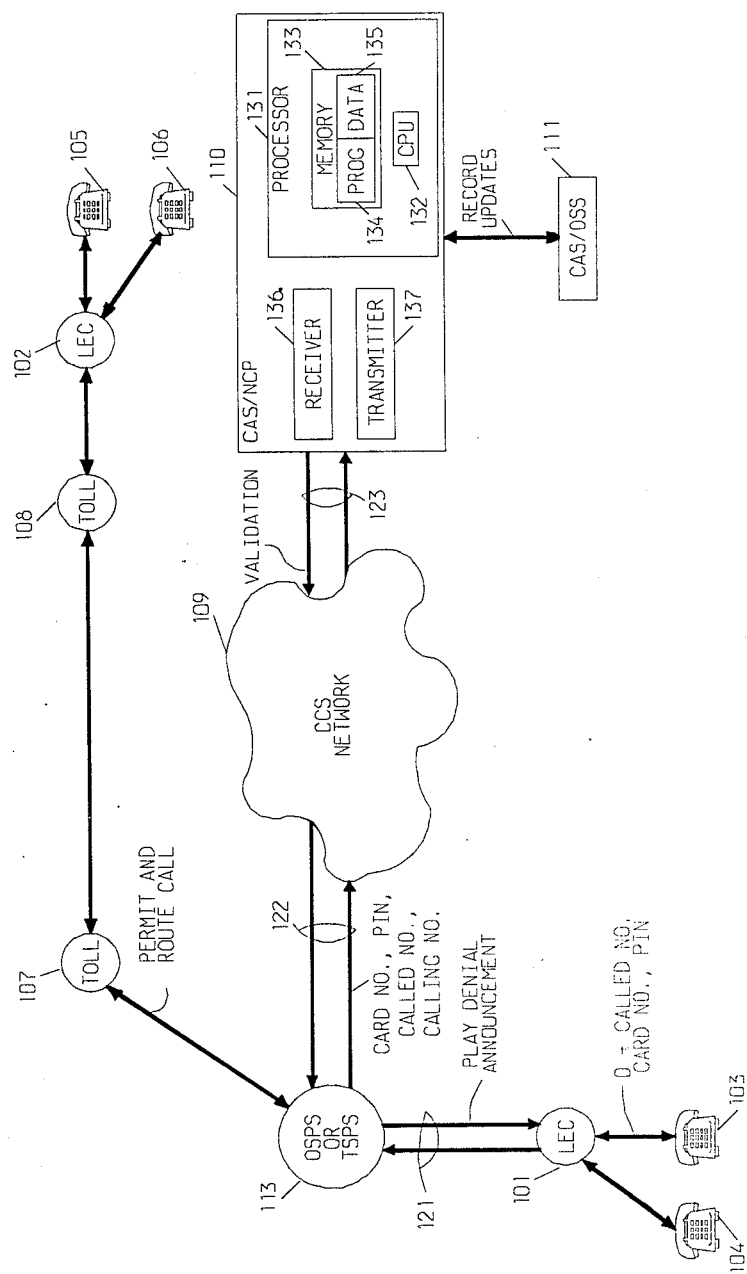
FIG. 1 shows, in block diagram form, an illustrative network configuration of Local Exchange Carriers (LEC), toll switching offices, a Common Channel Signaling (CCS) Network, Traffic Service Position System (TSPS) or Operator Services Position System (OSPS) equipment, Network Control Point (NCP) and Operations Support Systems (OSS) for providing credit card calls and useful in describing the operations of the CAS system.

Before proceeding with the operating description of the inventive CAS system, it should be recognized that the method of the CAS system may be adapted for use with a variety of different systems which can be arranged to implement the switching network configuration shown in FIG. 1. Since the various systems shown in FIG. 1 utilize a variety of hardware and programming techniques, no attempt is made to describe the existing programs used to control these various systems. However, using the following description as a guide, the operations of the CAS system must be integrated into the control structure of the various systems of FIG. 1, and tailored to cooperate with other features and operations of those systems. Thus, in order to avoid confusion and enable those skilled in the art to practice the claimed invention, this specification will describe the operation of the CAS system using the network block diagram of FIG. 1, the flowchart of FIG. 2 and the various tables shown in FIG. 3 which, together, are used to describe operating steps and the various data required to implement the CAS system. In the following description, the first digit of an element's reference number designates the figure where the element is located (e.g., 101 is located in FIG. 1).

With reference to FIG. 1, there is illustrated a block diagram of a well-known network configuration useful in describing the operation of the CAS system. The drawing illustrates two Local Exchange Carrier (LEC) switching offices 101 and 102, which serve associated telephone stations. The LEC 101 serves stations 103, 104; LEC 102 serves stations 105, 106. The drawing also discloses a Traffic Service Position System (TSPS) or Operator Services Position System (OSPS) 113 and toll offices 107 and 108 which, together, form a toll telephone network serving LEC's 101 and 102. The structural details of the LEC, toll offices, and the TSPS/OSPS system form no part of the present invention and are only described herein to the extent necessary for an understanding of the CAS system. For accuracy, it should be noted that the TSPS cannot send the calling party number in the CAS validation query shown on facility 123 of FIG. 1. For convenience, OSPS/TSPS 113 will be referred to hereinafter as OSPS 113.

A TSPS for serving credit card calls is disclosed in U.S. Pat. No. 3,484,560 issued to R. J. Jaeger, Jr., on Dec. 16, 1969, and the December, 1970, article in *Bell System Technical Journal*, 49, BSTJ No. 10, page 2417, et seq., which describes the structure and operations of TSPS equipment.

An illustrative OSPS is described in the article written by N. X. DeLessio, et al.: "An Integrated Operator Services Capability for the 5ESS Switching System", *International Switching Symposium* '84, (Florence), Session 22C, Paper 3, pp. 1–5, May, 1984.

Each of the LEC's, by way of example, is suitably an electronic program-controlled telephone system of the No. 1 ESS (Electronic Switching System) or No. 5 ESS type. The No. 1 ESS is described in the *Bell System Technical Journal* (BSTJ), September, 1964, Volume XLIII, Number 5, Parts 1 and 2; and in the R. W. Downing, et al., U.S. Pat. No. 3,570,008 of Mar. 9, 1971. The No. 5 ESS is extensively described in *AT&T Technical Journal*, vol. 64, no. 6, part 2, pp. 1305–1564, July/August, 1985. The above-identifie disclosures and the citations referred to therein may be consulted for a complete understanding of the construction and operations of a typical LEC office.

Each toll office, 107 and 108, may be, illustratively, an electronic program-cotrolled telephone system of the No. 4 ESS design with Common Channel Signaling (CCS or CCIS), as disclosed in the *Bell System Technical Journal* (BSTJ), September, 1977, Volume 56, No. 7.

The CCS direct signaling facilities 100 utilized and the data base system are basically a data link, or packet, switching system for routing messages in accordance with their address data contents. CCS system features are disclosed in the February, 1978, *Bell System Technical Journal* (BSTJ) No. 2 and in W. B. Smith, et al., U.S. Pat. No. 3,624,613 of Nov. 30, 1971.

An NCP is a centralized data base facility which is controlled by a processor 131 comprising CPU 132 and memory 133. The memory stores a system of programs 134 to establish, edit and manage information stored in its data memory 135. The program memory 134 includes and utilizes the special program steps outlined in the flow charts of FIG. 2 and the data of table 1 of FIG. 3 for implementing CAS. By way of example, NCP may comprise an AT&T Company 3B20D processor equipped with disk storage. A receiver 136 of NCP receives dual tone multi-frequency (DTMF) signals and other signals from facility link 123. A transmitter circuit 137 is included for signaling DTMF messages from NCP over link 123 to control the switching network.

The operation of Network Control Point (NCP) is described, for example, in the D. Sheinbein, et al., article on pp. 1737–1744 of *Bell System Technical Journal* (BSTJ), September, 1982, Volume 61, No. 7, part 3. The changes in the operation of NCP to perform the disclosed CAS/NCP 110 features is described in later paragraphs.

The operations of an Operations Support System (OSS) is generally described in *Bell System Information and Operations Systems*, March, 1980, Issue 4. The changes in the operations of OSS to perform the described CAS/OSS 111 features is described in later paragraphs.

Figure 2:
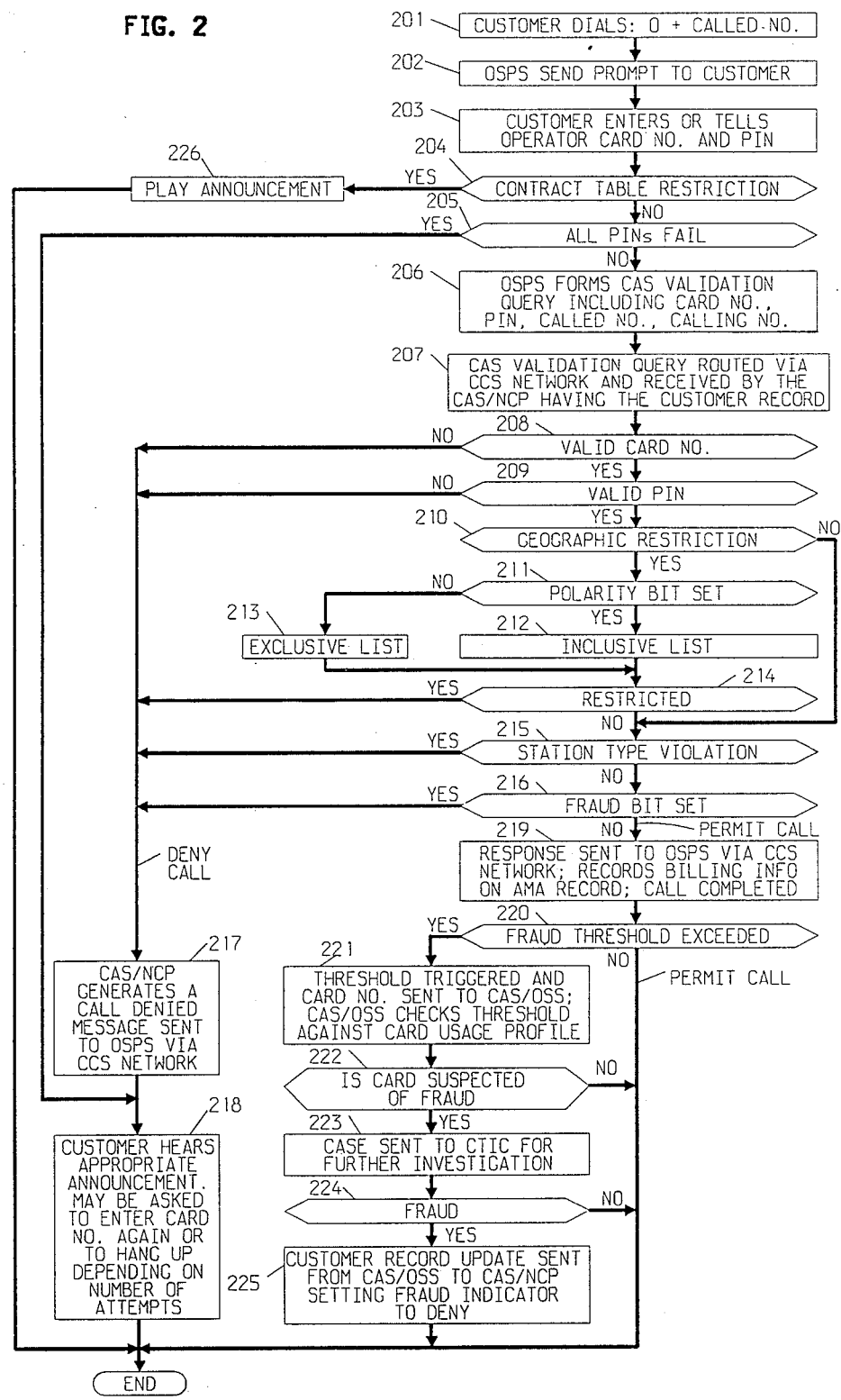
FIG. 2 shows a flow diagram of functions performed by the CAS system and other network elements of FIG. 1 in providing credit card calls in accordance with the operation of the present invention and FIG. 3 illustrates a contract table, a customer defined geographic restriction table and an invalid calling station table used with the CAS system.
Figure 3:
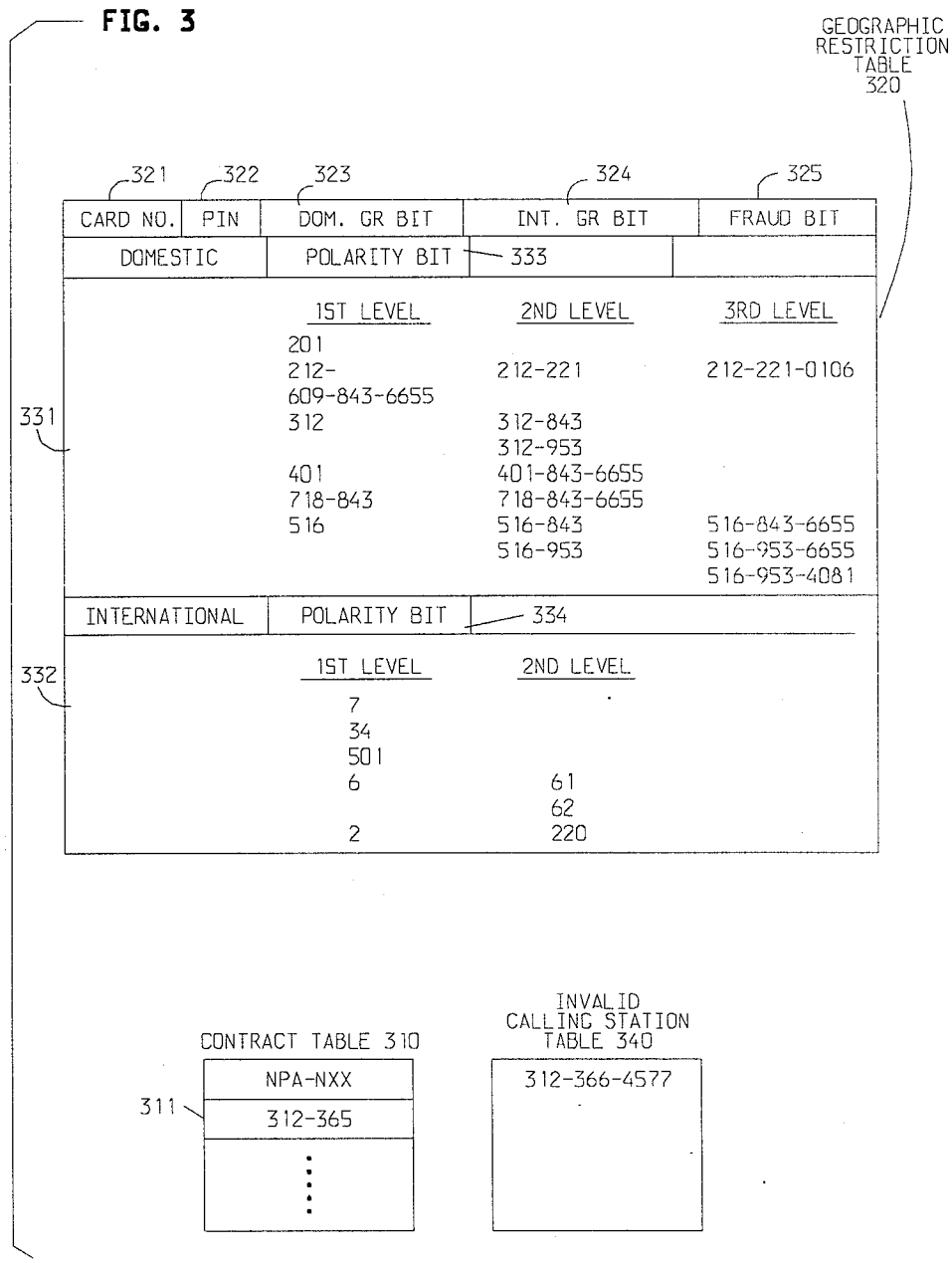

In the following description, we assume that a credit card call is handled without the intervention of an operator. An operator-assisted call will be described in a later paragraph. With reference to FIGS. 1–3, the automated processing of a credit card call with the CAS system is described by assuming that the call is originated at calling station 103 in Chicago and has, as a destination, station 105 in New York. Such a call involves the dialing of an initial zero plus ten digits (e.g., 0+NPA-NXX-XXXX) including an area code NPA number followed by seven digits NXX-XXXX identifying the called station. The "N" digit is any number 2–9 and each of the "X" digits is any number 0–9.

In step 201, a caller at staion 103 initiates a call, dials the zero, the area code digits and the called station number. For example, assume the called party at station 105 has the telephone number 212-221-0105. Office LEC 101, illustratively, routes the call to the toll telephone network over a trunk 121 to an OSPS system 113 equipped with CCS facilities. In step 202, the OSPS System 113 sends an alerting or prompting signal, for example, a "bong" tone or a tone and machine announcement for prompting the caller to dial the appropriate credit card number for billing purposes.

In step 203, for credit card calls from station 103 to any called station number, such as station 105, the caller responds to the prompting signal by dialing the credit card number (i.e., a billing code). The credit card number may be, illustratively, a CCITT International Standard telephone credit card number plus a four-digit PIN (Personal Identification Number) code, (YYYY). Each of the "Y" digits comprises any value 0–9. If necessary, OSPS 113 reminds the caller to enter the PIN code.

The caller's business telephone is, illustratively, station 104 in Chicago. The caller's business telephone includes, for example, an area code, 312, plus a seven digit number, 366-4576.

In accordance with an aspect of the invention, the credit card may also be implemented using a standard telephone credit card or any well-known commercial credit card. The use of a commercial credit card number for billing purposes has the advantage that it does not change when a customer changes his or her telephone number.

In step 204, the OSPS 113 checks if a contract table restriction exists for the particular credit card being used. The contract table 310 may, for example, indicate if the particular credit card can be used to bill calls handled by that LEC 101. The contract table information 311 for the LEC's may be defined in terms of which NPA-NXX's do not have billing agreements with this common carrier. In our example, since no contract table entry has previously been entered for LEC 101 (i.e., the NPA-NNX (312-366) part of the caller's telephone credit card number is not found in contract table 311) no contract table restriction exists and call processing can continue. If a contract table restriction exists, (e.g., a call from a station served by an LEC having an NPA-NXX of 312-365), an appropriate call denied message is announced, in step 226, to the caller and the call is terminated.

The OSPS 113 checks certain fraud criteria associated with the call. One fraud condition, the "all PIN's fail" condition shown in step 205, exists when repeated call attempts using a particular credit card give different wrong PIN codes. A fraud threshold is established to permit a certain number of misdialed PIN codes. If the fraud threshold is not exceeded, in step 205, then call processing continues. When a certain fraud threshold is exceeded in step 205, this indicates that either the caller forgot the PIN number (no fraud) or that that caller does not know the PIN number because it is not his or her credit card (fraud). Under these circumstances, the card number is deactivated at OSPS 113 for a given period of time. Thereafter, in step 218, an appropriate announcement is played to the calling party.

In step 206, the OSPS 113 inserts the credit card number in the address field of the CAS validation query. The CCS network then performs translation on the credit card number in the address field to determine which CAS/NCP location has the customer record for that credit card number. In our example OSPS 113 determines that a CAS validation query is to be routed to CAS/NCP 110 for checking the validation of the call. The OSPS 113 formulates a credit card validation query including the credit card number, PIN, called number and calling number. In step 207, the CAS validation is formatted into a standard CCS direct signaling message format and routed via link 122, CCS network 109, and link 123 to CAS/NCP 110.

In steps 208 through 216, CAS/NCP 110 performs several checks or comparisons to determine whether a dialed call, which is to be charged to a credit card number, should be permitted or denied. In step 208, the CAS/NCP 110 checks the validity of the credit card number in a well-known manner. If the credit card is invalid, CAS/NCP 110 generates a call denied message in step 217 which is sent via link 123, CCS network 109, and link 122 to OSPS 113. In step 218, OSPS 113 generates a call denied announcement which is sent via trunk 121 and LEC 101 to the caller's station 103. The caller may be asked to enter the card number again or to hang up depending on the number of attempts by the caller. Additionally, alternative billing means may also be requested from the caller.

If the credit card is valid, the PIN number is checked in step 209. If the PIN number is invalid, a call denied message is generated, in step 217, as previously described. If a valid PIN number is received, the geographic restriction table for the customer is checked in step 210.

Each customer account handled by CAS/NCP 110 has a Geographic Restriction (GR) table 320 as shown in FIG. 3. Optionally, as illustrated, a separate GR table 320 may exist for each valid PIN number 322 associated with the customer credit card number 321. The customer specifies any domestic or international geographic restrictions which are entered in GR table 320. If a domestic restriction is established, the GR bit 323 is set and, if an international restriction is established the GR bit 324 is set. The CAS/NCP 110 uses the called number to determine whether the call is domestic or international. In our domestic call example, the processor 131 of CAS/NCP 110 accesses GR table 320, in step 210, to determine if the customer's account has established any domestic geographic restriction, i.e., is GR bit 323 set. If GR bit 323 is not set, all domestic calls can be billed to that credit card number (subject to restrictions enforced for reasons other than customer-defined geographic dialing restrictions.) One such restriction is fraud which is checked in step 216 as described in a later paragraph.

If a GR bit 323 is set, then CAS/NCP 110 compares the called number against the restricted areas or numbers in the domestic field 321 of GR table 320. In step 211, a polarity bit 333 of domestic field 321 of table 320 is checked. If the polarity bit 333 is set, the list of numbers in the domestic field 331 of GR table 320 is considered inclusive. If the polarity bit 333 is not set, the list of numbers in domestic field 331 is considered exclusive. The terms "inclusive" and "exclusive" will be defined in a later paragraph.

GR table 320 may be implemented as shown in FIG. 3 to include a domestic restriction field 331 and an international restriction field 332. These fields may also be implemented to include multiple levels. Domestic field 331 is shown, illustratively, to include up to three levels for each domestic dialing sequence (e.g., called number). International field 332 is shown, illustratively, to include up to two levels for each foreign dialing sequence. It should be noted that the illustrative arrangement of GR table 320 may be adapted to best suit the restriction requirement needs of particular customers.

In GR table 320, the restrictions specified in domestic field 331 have no effect on international dialing. Additionally, restrictions specified in the international field 332 have no effect on domestic dialing.

Domestic dialing sequence lists in domestic field 331, are specified as any combination of NPA, NPA-NXX and NPA-NXX-XXXX. International dialing sequence lists, in international field 332, are specified as any combination of one-digit CCITT world zones and three-digit CCITT country codes.

As previously noted, each dialing field, whether domestic or international, may also have a customer specified polarity bit, respectively, 333 and 334. This dialing field polarity bit specifies that either the associated dialing sequences may be used or the associated dialing sequences may not be used when placing calls. If the dialing sequences in a first level may be used, the restriction list is called "inclusive". If the dialing sequences in a first level may not be used, the restriction list is called "exclusive". As noted, each list of dialing sequences may consist of up to three levels. The level of a dialing sequence within a list of dialing sequences is determined by the digits the sequence has in common with other sequences. A first level dialing sequence has either none or all digits in common with other dialing sequences. A second level dialing sequence has leading, but not all, digits in common with one first level dialing sequence. A third level dialing sequence has leading, but not all, digits in common with one first and one second level dialing sequence.

First level sequences define the rules for determining which dialing sequences may be used. Second level sequences define exceptions to the rules defined by first level sequences. Third level sequences define exceptions to the rules defined by first and second level sequences.

For inclusive lists, the customer may use any first level dialing sequence. The second level defines dialing sequences, within those allowed by the first level, that may not be dialed. The third level defines dialing sequences, within those disallowed by the second level, that may be dialed.

For exclusive lists, the customer may use any dialing sequence not identified by a first level dialing sequence. The second level defines dialing sequences, within those disallowed by the first level, that may be dialed. The third level defines dialing sequences, within those allowed by the second level, that may not be dialed.

Returning to our example, we assume the domestic polarity bit 333 is set, and hence the domestic field 331 is exclusive. Thus, in step 213 the first level list of domestic field 331 is exclusive. Consequently, calls to each NPA, NPA-NXX, and NPA-NXX-XXXX listed in the first level are prohibited. Since, in our example, the called number (i.e., 212-221-0105) has an NPA that is found in the first level list, i.e. 212, the call, as well as all other calls to area code 212, is geographically restricted at the first level. However, at the second level (which lists exceptions to the first level restrictions) calls to NPA number 212 and NXX number 221 are not geographically restricted. Thus, our example call to 212-221-0105 is not restricted, since it is an exception to the first level restriction. Similarly, calls to other NPA-NXX and NPA-NXX-XXXX listed in the second level are exceptions to the first level restrictions.

However, the third level must also be checked to determine if any exception exists to the second level permission granted. In our example, since the last four digits (or line number-0105) of the called party number are not found in the third level list, the call to 212-221-0105 is not geographically restricted.

Note, if the call had been placed to 212-221-0106 (station set 106) rather than 212-221-0105 the call would have been rejected at the third level of table 320. Similarly, calls to the other telephone numbers listed in the third level are prohibited.

If the domestic polarity bit was not set then the domestic field 331 is inclusive. Thus, the first level list would be inclusive, the second level list would be exceptions to the first level list permissions and the third level list would be permitted called numbers. Consequently, if the domestic polarity bit was not set, then in step 212 our example call to 212-221-0105 would have been restricted.

Note, if the call had been an international call, a procedure similar to the above-described domestic procedure would follow. Thus, the international polarity bit 334 is checked to determine if the international field 332 is inclusive or exclusive. The called international number would then be checked against the first and second levels to determine if the call should be permitted or denied.

Returning to our domestic call example, with the domestic polarity bit set, call processing continues as follows. Since, in our example the called number is not restricted in step 214, the CAS/NCP 110 proceeds with call processing and determines in step 215 if calling station type restrictions apply to the call.

In step 215, OSPS 113 checks table 340 to determine whether the calling station 103 is the type of station from which calls are restricted, i.e., calls from a pay phone which utilizes a particular type of alternative operator service. This feature is called terminating code screening. If the caling station 103 was of the restricted type, its number would be listed in table 340 (e.g., 312-366-4577) and a call denial message generated in step 217. Then, in step 218 an appropriate announcement would be played to the calling party. Since calling station 103 is not of the restricted type, CAS/NCP 110 proceeds, in step 216, to determine whether a fraud condition exists.

The GR table 320 includes a fraud indicator bit 325 which indicates whether credit card calling fraud has previously been detected for this credit card number and PIN. In step 216, CAS/NCP 110 detects if the fraud indicator bit is set. If the fraud bit is set, the call is denied and CAS/NCP 110 generates the call denied message which is sent to OSPS 113 in step 217. If the bit is not set, normal call processing proceed in step 219.

In step 219, CAS/NCP 110 generates a call permit message which is sent to OSPS 113. OSPS 113 records the customer billing information, in a well-known manner, using an automated message accounting (AMA) system and the call connection is completed between the calling and called stations.

Another type of fraud detection is performed in step 220 at CAS/NCP 110 and involves a threshold based on the number of credit card number billing attempts in a given period of time. Thus, notwithstanding the fact that a correct credit card number and PIN code are entered, a fraud condition may exist. Such a condition may exist, for example, when the credit card number and the PIN code have been misappropriated by the user. Under those circumstances, when the fraud threshold is exceeded in step 220 the CAS/NCP 110 sends the credit card number and information specifying which threshold was exceeded to the CAS/OSS 111 (step 221). Also in step 221, the CAS/OSS 111 checks the number of call attempts against a credit card usage profile.

In step 222, CAS/OSS 111 determines whether the credit card usage is suspected of fraud. If no fraud is suspected, no further action is taken. However, in step 222, if CAS/OSS 111 determines that fraud is suspected, the record is sent, in step 223, to the Card Threshold Investigation Center (CTIC) for further handling. The CTIC makes a final determination, in step 224, as to whether a credit card fraud condition exists. If no fraud condition exists, the inquiry is terminated. If a fraud condition exists, then, in step 225, CAS/OSS 111 sends an update message to CAS/NCP 110 to set a fraud indicator bit 325 of GR table 320. The fraud indicator bit 325 prevents subsequent calls from being charged to credit card number 321 and PIN 322.

The processing of a CAS type call assisted by an operator proceeds in the same manner as the above-described automated call. Thus, in step 203, the operator would collect the credit card number and PIN. If CAS/NCP 110 issues a denial message, the operator, in step 218, would inform the calling party that the card is invalid and would ask for alternative means for billing the call.

Thus, what has been described is a preferred embodiment of the invention. Other methods sequences or arrangements can be used to implement the present invention by those skilled in the art without departing from the spirit and scope of the present invention.

While the present invention has been described as restricting telephone calls, it should be understood that it may also be applied to restrict data, facsimile, video or other communication calls.

I claim:

1. In a data base system, a method of providing a calling charge validation service for determining whether a communication call connection should be complete by an associated communication switching system, the method characterized by the steps of
   receiving from said switching system a call message including a call billing code and a dialing sequence identifying the destination of a call,
   accessing a data base associated with said billing code to obtain stored dialing data which identifies potential destinations for said call, and
   comparing the dialing sequence against said stored dialing data and, in response to said comparison, signaling said switching system to control a call connection to the destination determined by said dialing sequence.

2. The method of claim 1 wherein said comparing step signals said switching system to deny the completion of the call connection to said destination.

3. The method of claim 1 wherein said comparing step signals said switching system to complete the call connection to said destination.

4. The method of claim 1 wherein said data base system includes a polarity bit associated with said billing code, said polarity bit having a first value indicating that said stored dialing data includes permissible call destinations and a second value indicating that said stored data includes impermissible call destinations; and wherein said comparing step is jointly responsive to said stored dialing data and the value of said polarity bit for signaling said switching system to control the call connection to said destination.

5. The method of claim 1 wherein said data base includes stored dialing data identifying a plurality of permissible destinations for said call.

6. The method of claim 1 wherein said data base includes stored dialing data identifying a plurality of impermissible destinations for said call.

7. The method of claim 1 wherein said data base includes previously stored billing code data, said method including the step of checking said received call billing code against said stored billing code data and, in response thereto, signaling said switching system to control the call connection to the destination determined by said dialing sequence.

8. The method of claim 1 wherein said data base includes a fraud indicator associated with said billing code, said method including the step of detecting the status of said fraud indicator and in response thereto, signaling said switching system to control the call connection to said destination determined by said dialing sequence.

9. The method of claim 1 wherein said received call message includes a calling station identification, and said method includes the step of determining if a calling station is a restricted station by checking said calling station identification against previously stored calling station identifications and, in response to said determination, signaling said switching system to control the call connection to said destination determined by said dialing sequence.

10. The method of claim 1 wherein said data base comprises two lists of dialing sequences including a first list where each dialing sequence thereon has no NPA or NXX codes in common with any other dialing sequence in said first list, and a second list where each second dialing sequence thereon has an NPA code in common with a dialing sequence of said first list.

11. The method of claim 10 wherein said data base comprises a third list of dialing sequences where each third list dialing sequence has both NPA and NXX codes in common with a dialing sequence of said second list.

12. The method of claim 1 wherein said data base includes a domestic list and an international list of dialing sequences for at least one billing code.

13. The method of claim 1 wherein said billing code is a nontelephone number based charge card number.

14. Apparatus for use in conjunction with a communication system for providing a calling charge validation service for determining whether a communication call should be processed by said communication switching system, said apparatus including data base means for storing previously entered dialing data which identifies potential destinations for calls chargeable to a billing code, means for receiving from said switching system a call message icluding a call billing code and a dialing sequence identifying the destination of a call, and processor means for accessing said data base means using said received billing code, comparing the received dialing sequence with stored dialing data associated with said received billing code, and in response to said comparison, signaling said switching system to control a call connection to the destination determined by said dialing sequence.

15. The apparatus of claim 14 wherein said data base system includes a polarity bit associated with said billing code, said polarity bit having a first value indicating that said stored dialing data includes permissible call destinations and a second value indicating that said stored dialing data includes impermissible call destinations; and wherein said processor means is jointly responsive to said stored dialing data and the value of said polarity bit for signaling said switching system to control the call connection to said destination.

16. The apparatus of claim 14 wherein said data base includes previously stored billing code data and said processor means includes means for checking said received call billing code against said stored billing code data and, in response thereto, signaling said switching system to control the call connection to the destination determined by said dialing sequence.

17. The apparatus of claim 14 wherein said data base includes a fraud indicator associated with said billing code, and said processor means includes means for detecting the status of said fraud indicator and in response thereto, signaling said switching system to control the call connection to said destination determined by said dialing sequence.

18. The apparatus of claim 14 wherein said received call message includes a calling station identification, and said processor means includes means for determining if a calling station is a restricted station by checking said calling station identification against previously stored calling station identifications and, in response to said determination, signaling said switching system to control the call connection to the destination determined by said dialing sequence.

19. The apparatus of claim 14 wherein said data base comprises two lists of dialing sequences including a first list where each dialing sequence thereon has no NPA or NXX codes in common with any other dialing sequence in said first list, and a second list where each second dialing sequence thereon has an NPA code in common with a dialing sequence of said first list.

20. The apparatus of claim 14 wherein said data base comprises a third list of dialing sequences where each third list dialing sequence has both NPA and NXX codes in common with a dialing sequence of said second list.

21. A method of providing a calling charge validation service for a communication system for determining whether a communication call should be processed by said communication switching system, characterized by the steps of:

receiving from a caller a call message including a call billing code and a dialing sequence identifying the destination of a call, accessing a data base associated with said billing code to obtain stored dialing data which identifies restricted and unrestricted call destinations, and comparing the received dialing sequence with said stored dialing data and, in response thereto, controlling a call connection to the destination determined by said dialing sequence.

22. The method of claim 21 wherein said data base system includes a polarity bit associated with said billing code, said polarity bit having a first value indicating that said stored dialing data includes permissible call destinations and a second value indicating that said stored dialing data includes impermissible call destinations; and wherein said comparing step is jointly responsive to said stored dialing data and the value of said polarity bit for controlling the call connection to said destination.

23. The method of claim 22 wherein said data base includes stored billing code data, said method including the step of checking said received call billing code against previously stored billing code data and, in response thereto, controlling the call connection to said destination.

24. The method of claim 22 wherein said data base includes a fraud bit associated with said billing code, said method including the step detecting the status of said fraud bit and, in response thereto, controlling the call connection to said destination.

25. The method of claim 22 wherein said received call message includes a calling station identification and said method includes the step of determining if a calling station is a restricted station by checking said calling station identification against previously stored calling station identifications and, in response to said determination, controlling the call connection to said destination.

26. The method of claim 22 wherein said data base comprises two lists of dialing sequences including a first list where each dialing sequence thereon has no NPA or NXX codes in common with any other dialing sequence in said first list, and a second list where each second dialing sequence thereon has an NPA code in common with a dialing sequence of said first list.

27. The method of claim 22 wherein said data base comprises a third list of dialing sequences where each third list dialing sequence has both NPA and NXX codes in common with a dialing sequence of said second list.

* * * * *